(12) United States Patent
Wang et al.

(10) Patent No.: US 11,656,381 B2
(45) Date of Patent: May 23, 2023

(54) EXTRACTING SHEAR WAVE SLOWNESS FROM HEXAPOLE WAVES AND OCTUPOLE WAVES

(71) Applicant: Halliburton Energy Services, Inc., Houston, TX (US)

(72) Inventors: Ruijia Wang, Singapore (SG); Brenda Sue Jonathan, Bangkok (TH); Richard Timothy Coates, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 393 days.

(21) Appl. No.: 16/838,427

(22) Filed: Apr. 2, 2020

(65) Prior Publication Data
US 2021/0311222 A1 Oct. 7, 2021

(51) Int. Cl.
*G01V 1/50* (2006.01)

(52) U.S. Cl.
CPC ............ *G01V 1/50* (2013.01); *G01V 2200/16* (2013.01); *G01V 2210/6222* (2013.01)

(58) Field of Classification Search
CPC ............... G01V 1/50; G01V 1/48; G01V 1/52
See application file for complete search history.

(56) References Cited

U.S. PATENT DOCUMENTS

| | | | | |
|---|---|---|---|---|
| 7,039,524 B2* | 5/2006 | Haugland | ................ | G01V 1/48 702/6 |
| 7,089,118 B2* | 8/2006 | Haugland | ................ | G01V 1/48 702/6 |
| 7,120,541 B2 | 10/2006 | Wang | | |
| 8,069,913 B2* | 12/2011 | Coste | ...................... | G01V 1/52 166/250.11 |

(Continued)

FOREIGN PATENT DOCUMENTS

| | | |
|---|---|---|
| KR | 10-2006-0049319 A | 5/2006 |
| WO | 2014070182 | 5/2014 |

(Continued)

OTHER PUBLICATIONS

Schlumberger, Sonicscope, The Next Generation of Sonic while Drilling.

(Continued)

*Primary Examiner* — Albert K Wong
(74) *Attorney, Agent, or Firm* — Benjamin Ford; C. Tumey Law Group PLLC

(57) ABSTRACT

Disclosed is a system and method for calculating a formation shear-wave slowness. The system includes a borehole sonic logging tool and an information handling system. The borehole sonic logging tool may comprise a transmitter comprising one or more elements disposed at one or more radial distances from an axis of the borehole sonic logging tool and the transmitter is configured to transmit a first mode into a borehole. The sonic logging tool may further include one or more receivers disposed at a second radial distance from the axis of the borehole sonic logging tool and are configured to detect a second mode that one or more lobes than is a higher order than the first mode. A method may comprise broadcasting the first mode into the borehole, recording the second mode from the borehole with the one or more receivers, and calculating the formation shear-wave slowness from the second mode.

18 Claims, 12 Drawing Sheets

(56) References Cited

U.S. PATENT DOCUMENTS

| | | | |
|---|---|---|---|
| 8,456,952 B2 | 6/2013 | Tang et al. | |
| 9,606,254 B2 * | 3/2017 | Cheng | G01V 1/44 |
| 10,684,384 B2 * | 6/2020 | Sarkar | G01V 1/48 |
| 11,243,326 B2 * | 2/2022 | Ge | G01V 3/34 |
| 2005/0067564 A1 | 3/2005 | Douglas et al. | |
| 2005/0105072 A1 | 5/2005 | Nam et al. | |
| 2006/0118716 A1 | 6/2006 | Michaud et al. | |
| 2006/0198242 A1 | 9/2006 | Geerits et al. | |
| 2007/0272853 A1 | 11/2007 | Konenkov et al. | |
| 2008/0149416 A1 | 6/2008 | Coates et al. | |
| 2009/0236145 A1 | 9/2009 | Bennett et al. | |
| 2009/0295393 A1 | 12/2009 | Bespalov et al. | |
| 2012/0037423 A1 | 2/2012 | Gerrits et al. | |
| 2013/0240724 A1 | 9/2013 | Guna | |
| 2014/0010045 A1 | 1/2014 | Bennett et al. | |
| 2014/0372044 A1 | 12/2014 | Jiao et al. | |
| 2015/0301208 A1 | 10/2015 | Lewis et al. | |
| 2016/0274256 A1 | 9/2016 | Coates et al. | |
| 2016/0291184 A1 | 10/2016 | Coates et al. | |
| 2018/0045844 A1 | 2/2018 | Oshima et al. | |
| 2018/0341036 A1 | 11/2018 | Sarkar et al. | |
| 2019/0018161 A1 | 1/2019 | Wang et al. | |
| 2019/0018162 A1 | 1/2019 | Wang et al. | |
| 2019/0025451 A1 | 1/2019 | Wang et al. | |
| 2019/0025452 A1 | 1/2019 | Wang et al. | |
| 2019/0257971 A1 | 8/2019 | Wang et al. | |
| 2019/0293823 A1 | 9/2019 | Sun et al. | |
| 2019/0317238 A1 | 10/2019 | Wang et al. | |
| 2020/0049850 A1 | 2/2020 | Liu et al. | |
| 2020/0072036 A1 | 3/2020 | Wang | |

FOREIGN PATENT DOCUMENTS

| | | |
|---|---|---|
| WO | 2017172799 | 10/2017 |
| WO | 2017172810 | 10/2017 |

OTHER PUBLICATIONS

BHGE SoundTrak enabled drilling in large, deviated deepwater borehole, 2019.
SPERRY—XBAT Plus Azimuthal Sonic and Ultrasonic LWD Service, Halliburton, May 2019. H013097.
International Search Report and Written Opinion for Application PCT/US2020/026922, dated Oct. 15, 2020.

* cited by examiner

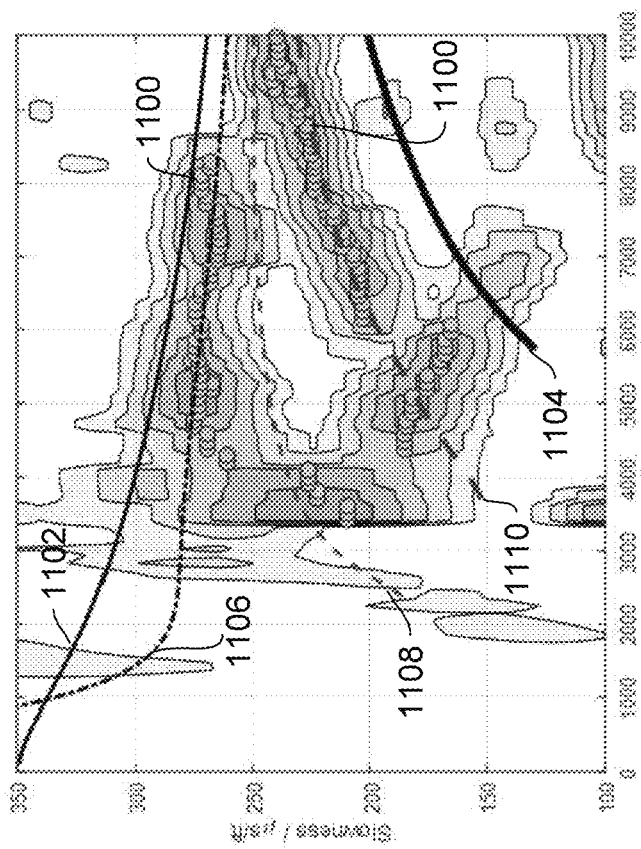
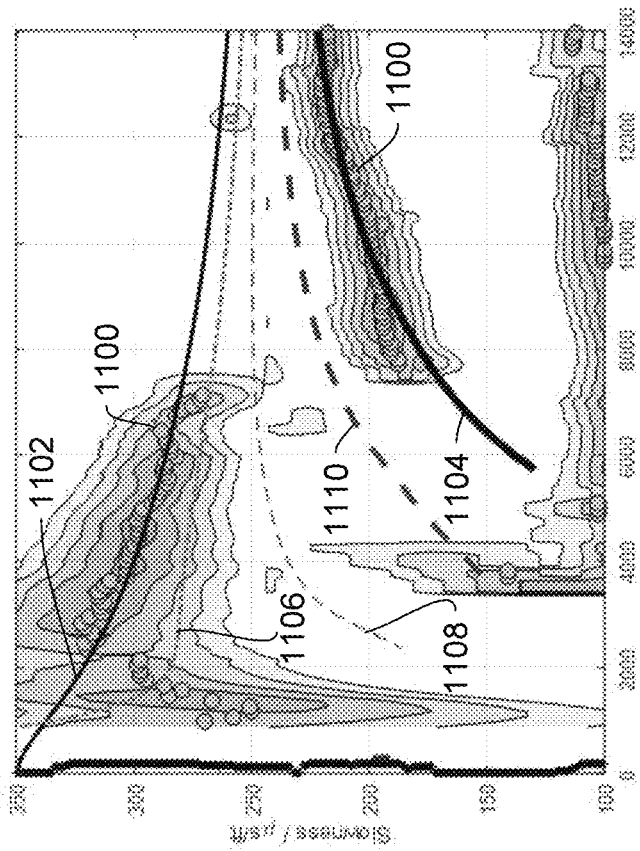
FIG. 11A
FIG. 11B

EXTRACTING SHEAR WAVE SLOWNESS FROM HEXAPOLE WAVES AND OCTUPOLE WAVES

BACKGROUND

In order to obtain hydrocarbons such as oil and gas, boreholes are drilled through hydrocarbon-bearing subsurface formations. During drilling, sonic logging tools may operate to determine the properties of formations surrounding the borehole. In measurement-while-drilling (MWD) or logging-wile-drilling (LWD) techniques, the testing equipment is conveyed down the borehole along with the drilling equipment. These tests may include resistivity testing equipment, gamma radiation testing equipment, seismic imaging equipment, sonic logging equipment, and/or the like.

During drilling operations, one or more LWD sonic logging tools may use guided-waves, such as dipole flexural, and quadrupole screw waves, to infer formation properties. Usually, the slownesses of these waves approach the formation body-wave slownesses at low frequencies. Thus, these waves are used to estimate formation slownesses and anisotropy.

Different types of sonic transmitters preferentially excite different waves. For example, monopole, dipole, and quadrupole transmitters excite Stoneley, flexural, and screw modes, respectively. The flexural waves are used in wireline logging to estimating shear slowness. However, in an LWD environment, the formation flexural waves are coupled to the tool flexural waves at low frequencies. As a result, the low-frequency asymptote no longer approaches the formation shear slowness (DTS). Additionally, higher-pole waves, such as the screw waves excited by the quadrupole source, are less coupled to tool waves and thus may provide reliable shear slownesses. Consequently, quadrupole sources are widely used for LWD shear slowness estimation.

However, the low-frequency portion of LWD screw wave dispersion curve is steep and sensitive to tool parameters and borehole diameter when the borehole wall is close to the tool surface. Consequently, the resulting shear slowness (DTS) estimate may be erroneous, particularly when the low-frequency portion of the data exhibits a low signal-to-noise ratio.

BRIEF DESCRIPTION OF THE DRAWINGS

These drawings illustrate certain aspects of some examples of the present disclosure and should not be used to limit or define the disclosure.

FIGS. 11A and 11B are graphs showing measured and theoretical dispersion curves generated by an LWD monopole and dipole source, respectively;

DETAILED DESCRIPTION

Acoustic wave fields in boreholes are often dominated by the fundamental modes. For example, the fundamental flexural and quadrupole modes often dominate the field generated by dipole and quadrupole sources, respectively. Formation elastic properties are typically estimated from these modes. However, when logging-while-drilling (LWD), the presence of a large tool mandrel may perturb the fundamental modes, particularly when the tool is partially or fully eccentric or the data is contaminated by tool body waves, resulting in erroneous formation slowness estimates.

Current methods and systems for determining logging while drilling (LWD) shear slowness are based on dipole flexural waves or quadrupole screw waves. However, dipole flexural waves are not asymptotic to shear waves at low frequencies, and may be influenced by coupled Stoneley wave due to eccentric or unbalanced receivers. While screw waves may operate in soft formation situations, the results may be biased in fast and medium formation type due to the nature of the dispersion curves. These dispersion curves become steep at low frequencies, which may result in erroneous outputs. For fast formation, common methods are to utilize monopole refracted shear waves or quadrupole high-order waves for picking shear slowness. However, for formations with a medium slowness, these waves are often not well excited.

As discussed below, higher-pole modes, including the hexapole and octupole waves, are seen in LWD acoustic data. These high-pole modes are less affected by tool properties and hole size than the fundamental modes, and the high-pole modes provide an alternative way of estimating formation wave slowness. This is an improvement over current technology in that the low-frequency portion of the fundamental waves are often absent or contaminated by low-frequency drilling noise. Thus, estimating the formation shear-wave slowness (DTS) from these higher-pole modes reduce error in measurements, when compared to errors in estimates from lower-pole modes requiring low-frequencies often impaired by a low signal-to-noise ratio.

Specially designed transmitters may be used to excite higher-pole modes, but high-pole modes may be excited by conventional LWD monopole and dipole transducers. Discussed below are systems and methods for generating and capturing hexapole modes or octupole modes with LWD sonic transmitter and receivers to overcome the shortcomings, discussed above, of current methods and systems. Furthermore, current technology does not utilize hexapole or octupole data for processing.

Figure 1:
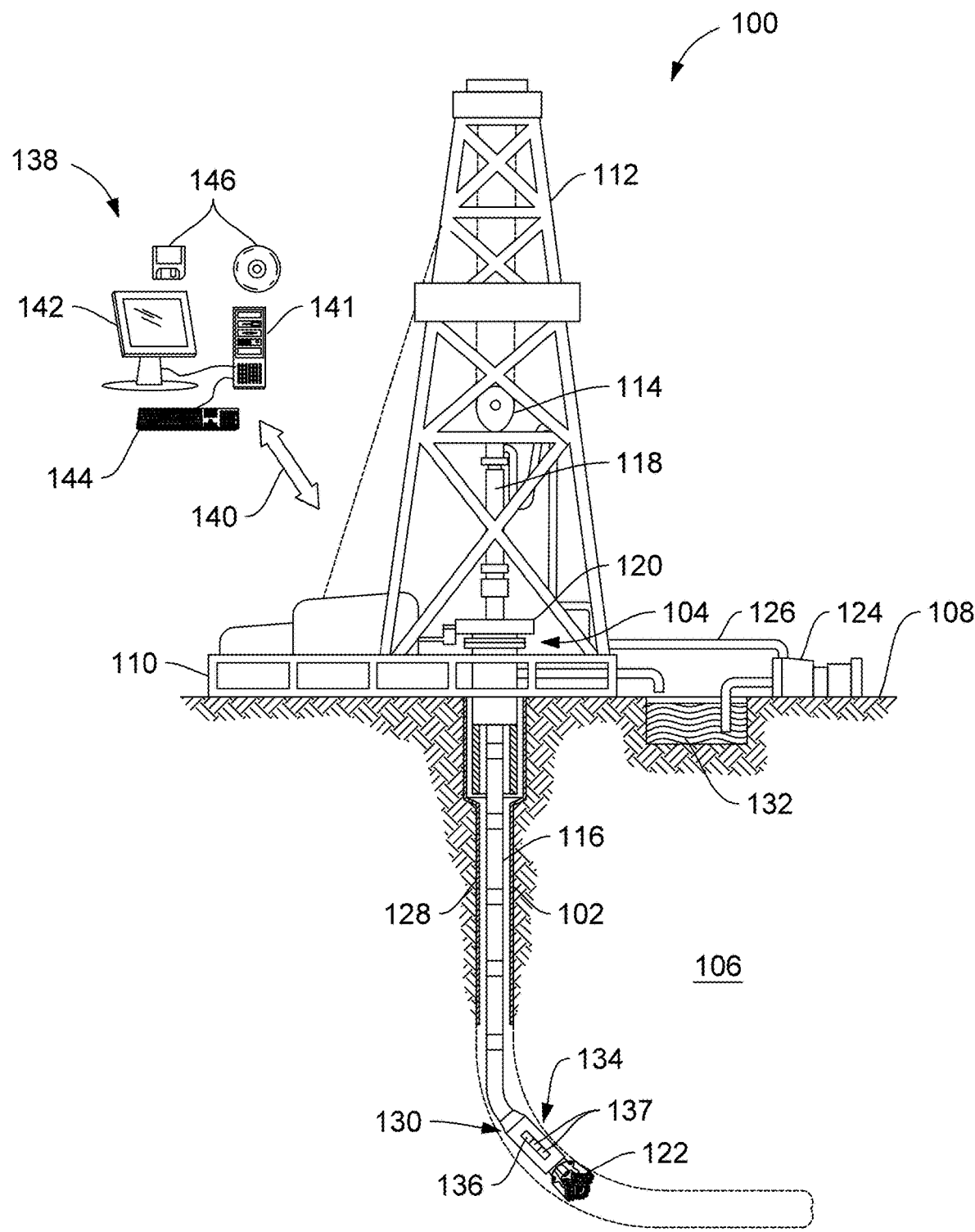
FIG. 1 illustrates an example of a drilling system.

FIG. 1 illustrates a drilling system 100 in accordance with example embodiments. As illustrated, borehole 102 may extend from a wellhead 104 into a subterranean formation 106 from a surface 108. Generally, borehole 102 may include horizontal, vertical, slanted, curved, and other types of borehole geometries and orientations. Borehole 102 may be cased or uncased. In examples, borehole 102 may include a metallic member. By way of example, the metallic member may be a casing, liner, tubing, or other elongated steel tubular disposed in borehole 102.

As illustrated, borehole 102 may extend through subterranean formation 106. As illustrated in FIG. 1, borehole 102 may extend generally vertically into the subterranean formation 106, however borehole 102 may extend at an angle through subterranean formation 106, such as horizontal and slanted boreholes. For example, although FIG. 1 illustrates a vertical or low inclination angle well, high inclination angle or horizontal placement of the well and equipment may be possible. It should further be noted that while FIG. 1 generally depicts land-based operations, those skilled in the art may recognize that the principles described herein are equally applicable to subsea operations that employ floating or sea-based platforms and rigs, without departing from the scope of the disclosure.

As illustrated, a drilling platform 110 may support a derrick 112 having a traveling block 114 for raising and lowering drill string 116. Drill string 116 may include, but is not limited to, drill pipe and coiled tubing, as generally known to those skilled in the art. A kelly 118 may support drill string 116 as it may be lowered through a rotary table 120. A drill bit 122 may be attached to the distal end of drill string 116 and may be driven either by a downhole motor and/or via rotation of drill string 116 from surface 108. Without limitation, drill bit 122 may include, roller cone bits, PDC bits, natural diamond bits, any hole openers, reamers, coring bits, and the like. As drill bit 122 rotates, it may create and extend borehole 102 that penetrates various subterranean formations 106. A pump 124 may circulate drilling fluid through a feed pipe 126 through kelly 118, downhole through interior of drill string 116, through orifices in drill bit 122, back to surface 108 via annulus 128 surrounding drill string 116, and into a retention pit 132.

With continued reference to FIG. 1, drill string 116 may begin at wellhead 104 and may traverse borehole 102. Drill bit 122 may be attached to a distal end of drill string 116 and may be driven, for example, either by a downhole motor and/or via rotation of drill string 116 from surface 108. Drill bit 122 may be a part of bottom hole assembly (BHA) 130 at distal end of drill string 116. BHA 130 may further include tools for look-ahead resistivity applications. As will be appreciated by those of ordinary skill in the art, BHA 130 may be a measurement-while-drilling (MWD) or logging-while-drilling (LWD) system.

BHA 130 may comprise any number of tools, transmitters, and/or receivers to perform downhole measurement operations. For example, as illustrated in FIG. 1, BHA 130 may include a borehole sonic logging tool 134. It should be noted that borehole sonic logging tool 134 may make up at least a part of BHA 130. Without limitation, any number of different measurement assemblies, communication assemblies, battery assemblies, and/or the like may form BHA 130 with borehole sonic logging tool 134. Additionally, borehole sonic logging tool 134 may form BHA 130 itself. In examples, borehole sonic logging tool 134 may comprise a transmitter 136. Transmitter 136 may be connected to information handling system 138, discussed below, which may further control the operation of transmitter 136. Transmitter 136 may include any suitable transmitter for generating sound waves that travel into formation 106, including, but not limited to, piezoelectric transmitters. Transmitter 136 may be a monopole source, a multi-pole source (e.g., a dipole source, quadrupole source, hexapole source, unipole source), high-order multipole, or any combination of multiple sources. Combinations of different types of transmitters may also be used. During operations, transmitter 136 may broadcast sound waves (e.g., sonic waveforms) from borehole sonic logging tool 134 that travel into formation 106. The sound waves may be emitted at any suitable frequency range. For example, a broadband response could be from about 0.2 kHz to about 20 kHz, and a narrow band response could be from about 1 kHz to about 6 kHz. It should be understood that the present technique should not be limited to these frequency ranges. Rather, the sound waves may be emitted at any suitable frequency for a particular application.

Borehole sonic logging tool 134 may also include a receiver 137. As illustrated, there may be a plurality of receivers 137 disposed on borehole sonic logging tool 134. Receiver 137 may include any suitable receiver for receiving sound waves, including, but not limited to, piezoelectric receivers. For example, receiver 137 may be a monopole receiver, a unipole receiver, or multi-pole receiver (e.g., a dipole receiver). In examples, a monopole receiver 137 may be used to record compressional-wave (P-wave) signals, while the multi-pole receiver 137 may be used to record shear-wave (S-wave) signals. Receiver 137 may have the function of recording dipole signals from two directions that are perpendicular to each other. Receiver 137 may also have the function of recording quadrupole signals from two directions that have 45 degrees apart. In examples, signals recorded by receiver 137 may be digitally created by information handling system 138 in any direction to simulate dipole and quadrupoles measurements. Receiver 137 may measure and/or record sound waves broadcast from transmitter 136 as received signals. The sound waves received at receiver 137 may include both direct waves that traveled along the borehole 102 and refract through formation 106 as well as waves that traveled through formation 106 and reflect off of near-borehole bedding and propagate back to the borehole. By way of example, the received signal may be recorded as an acoustic amplitude as a function of time. Information handling system 138 may control the operation of receiver 137. The measured sound waves may be transferred to information handling system 138 for further processing. In examples, there may be any suitable number of transmitters 136 and/or receivers 137, which may be controlled by information handling system 138. Information and/or measurements may be processed further by information handling system 138 to determine properties of borehole 102, fluids, and/or formation 106.

Without limitation, BHA 130 may be connected to and/or controlled by information handling system 138, which may be disposed on surface 108. Without limitation, information handling system 138 may be disposed downhole in BHA 130. Processing of information recorded may occur downhole and/or on surface 108. Processing occurring downhole may be transmitted to surface 108 to be recorded, observed, and/or further analyzed. Additionally, information recorded on information handling system 138 that may be disposed downhole may be stored until BHA 130 may be brought to surface 108. In examples, information handling system 138 may communicate with BHA 130 through a communication line (not illustrated) disposed in (or on) drill string 116. In examples, wireless communication may be used to transmit information back and forth between information handling system 138 and BHA 130. Information handling system 138 may transmit information to BHA 130 and may receive as well as process information recorded by BHA 130. In examples, a downhole information handling system (not illustrated) may include, without limitation, a microprocessor or other suitable circuitry, for estimating, receiving and processing signals from BHA 130. Downhole information handling system (not illustrated) may further include additional components, such as memory, input/output devices, interfaces, and the like. In examples, while not illustrated, BHA 130 may include one or more additional components, such as analog-to-digital converter, filter and amplifier, among others, that may be used to process the measurements of BHA 130 before they may be transmitted to surface 108. Alternatively, raw measurements from BHA 130 may be transmitted to surface 108.

Any suitable technique may be used for transmitting signals from BHA 130 to surface 108, including, but not limited to, wired pipe telemetry, mud-pulse telemetry, acoustic telemetry, and electromagnetic telemetry. While not illustrated, BHA 130 may include a telemetry subassembly that may transmit telemetry data to surface 108. At surface 108, pressure transducers (not shown) may convert the pressure signal into electrical signals for a digitizer (not illustrated). The digitizer may supply a digital form of the telemetry signals to information handling system 138 via a communication link 140, which may be a wired or wireless link. The telemetry data may be analyzed and processed by information handling system 138.

As illustrated, communication link 140 (which may be wired or wireless, for example) may be provided that may transmit data from BHA 130 to an information handling system 138 at surface 108. Information handling system 138 may include a personal computer 141, a video display 142, a keyboard 144 (i.e., other input devices), and/or non-transitory computer-readable media 146 (e.g., optical disks, magnetic disks) that can store code representative of the methods described herein. In addition to, or in place of processing at surface 108, processing may occur downhole. Information handling system 138 may direct one or more transmitters 136 to operate and/or function. Likewise, information handling system 138 may process measurements taken by one or more receivers 137. As discussed below, transmitters 136 and receivers 137 may include a unipole with a single element, an LWD monopole with four elements, or an LWD dipole with two elements. As discussed below, an element may also be referred to as a point source.

Figure 2A:
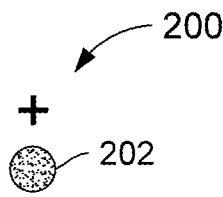
FIGS. 2A-2G illustrate different types of transmitters and/or receivers.

FIG. 2A-2G illustrate sketch maps of configurations for creating multiple sources with one or more elements, and each element is represented by a point source. For example, FIG. 2A is a sketch map for an ideal monopole 200, which may be referred to as a monopole mode, formed from a single positive phase point source 202. This allows for the monopole 200 to be omni-directional. In examples, one realization of monopole source are consistent with four point sources, illustrated in FIG. 2F and FIG. 6, disposed around and/or on an axis of BHA 130 (e.g., referring to FIG. 1). During operations, one or more point sources may be activated, "fired," together (in phase) which may approximate a monopole 200. However, this activation may contain octupole contamination. Octupole contamination may be used for further measurements, as discussed below.

Figure 2B:
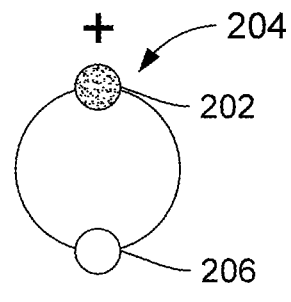

FIG. 2B illustrates a sketch map of a dipole 204, which may be referred to as a dipole mode. A dipole 204 may be represented by two-point sources with opposite phase, a positive phase point sources 202 and a negative phase point sources 206. During operations, two sets of point sources, each set including one point source on opposite sides of BHA 130, are activated with opposite polarity (in antiphase) these approximate a dipole 204 but may also contain hexapole contamination. Hexapole contamination may be used for further measurements, as discussed below.

Figure 2C:
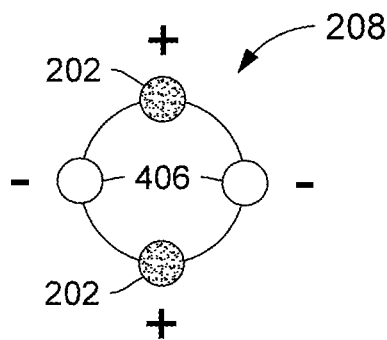

A quadrupole 208, as illustrated in FIG. 2C, may be represented by four-point sources with different phases, two positive phase point sources 202 and two negative phase point sources 206. Quadrupole 208 may be referred to as a quadrupole mode. During operations, all point sources may be activated with alternating polarity (in antiphase) while progressing around BHA 130. This may approximate a quadrupole, which may also include 12-pole contamination, which may be used in other measurements.

Figure 2D:
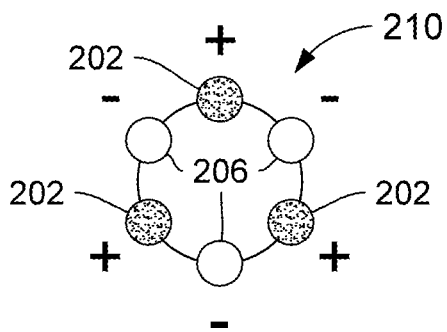

A hexapole 210, as illustrated in FIG. 2D, may be represented by six-point sources with different phases, three positive phase point sources 202 and three negative phase point sources 206. Hexapole 210 may be referred to as a hexapole mode. As illustrated, both hexapole 210 and dipole 204 have a symmetric axis at the azimuth of 90-180 degrees, suggesting that the two fields may be coupled.

Figure 2E:
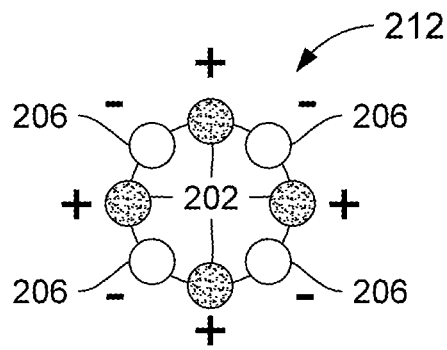
Figure 2F:
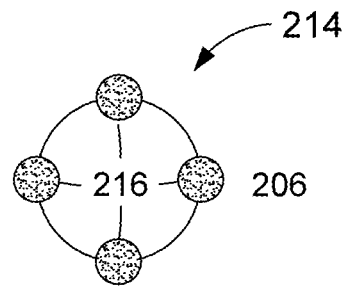
Figure 6:
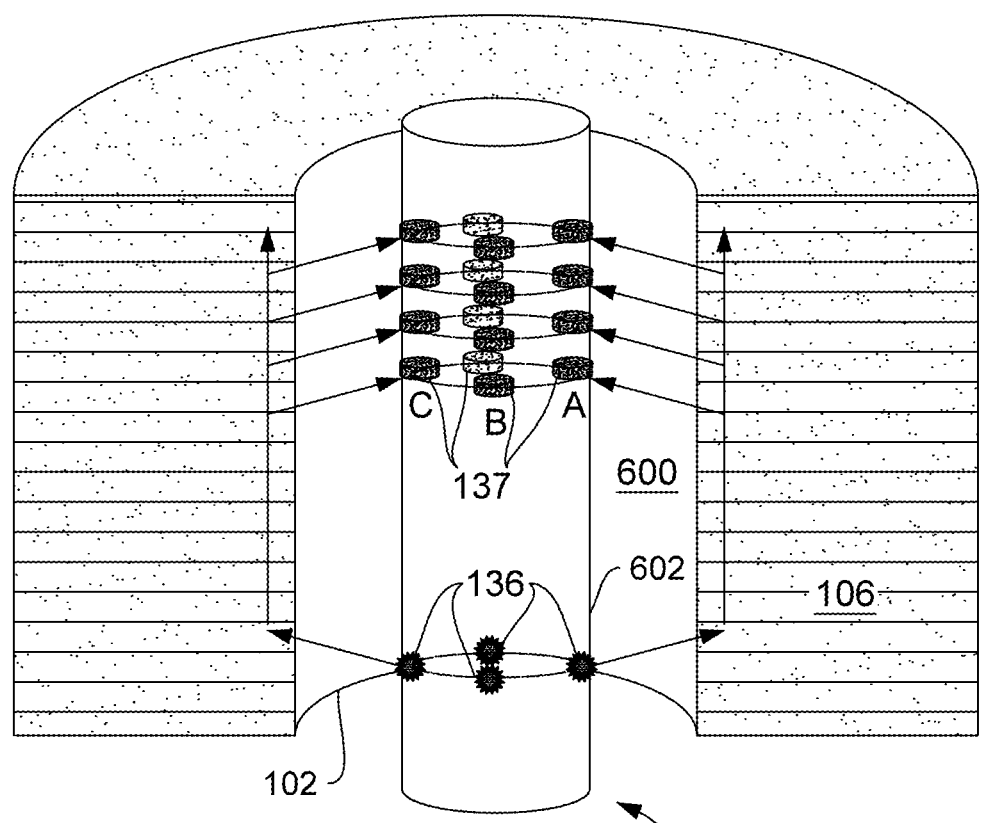
FIG. 6 illustrates an example of a borehole sonic logging tool disposed in a borehole.

An octupole 212, as illustrated in FIG. 2E, may be represented by eight-point sources with different phases, four positive phase point sources 202 and four negative phase sources receivers 206. Octupole 212 may be referred to as an octupole mode. One realization of a monopole source is a single centered point source as shown in FIG. 2A. However, a practical LWD monopole source 214 usually consists of elements 216, which may also be referred to as transmitters or point sources, orthogonally arranged around the tool circumference as shown in FIG. 2F, fired together with the same drive pulse, as illustrated in FIG. 6 and discussed below. The positions of these individual transmitters coincide with the positions of alternate transmitters for an octupole 212 as shown in FIG. 2E. (For an octupole transmitter the interleaving sources, such as a plurality of monopole sources 200, fired with a reversed polarity).

Figure 2G:
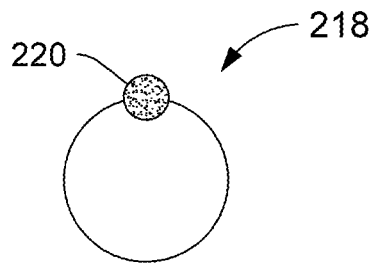

An unipole 218, as illustrated in FIG. 2G, may be represented by a single eccentric point source 220. As discussed below, a field generated by unipole 218 may comprise all type of borehole modes, including monopole mode, dipole mode, quadrupole mode, hexapole mode, octupole mode and other high-pole modes.

Figure 3:
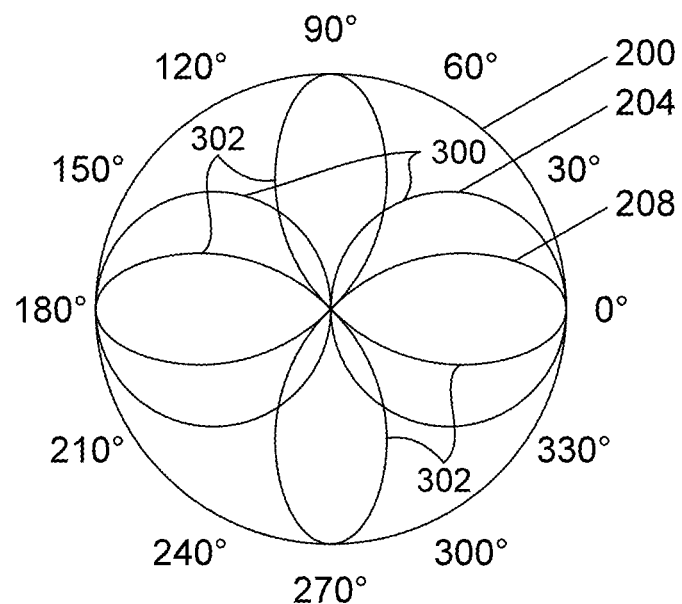
FIG. 3 is a graph of different types of radiation and/or reception pattern.
Figure 4:
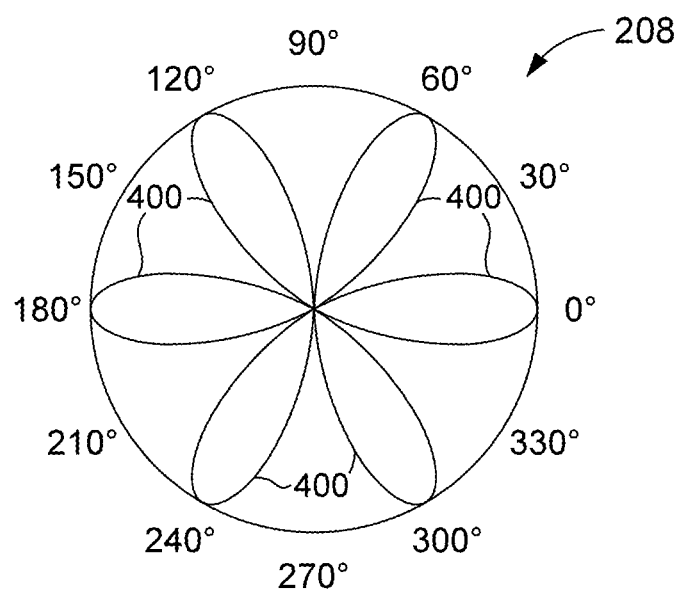
FIG. 4 is a graph of a hexapole radiation and/or reception pattern.
Figure 5:
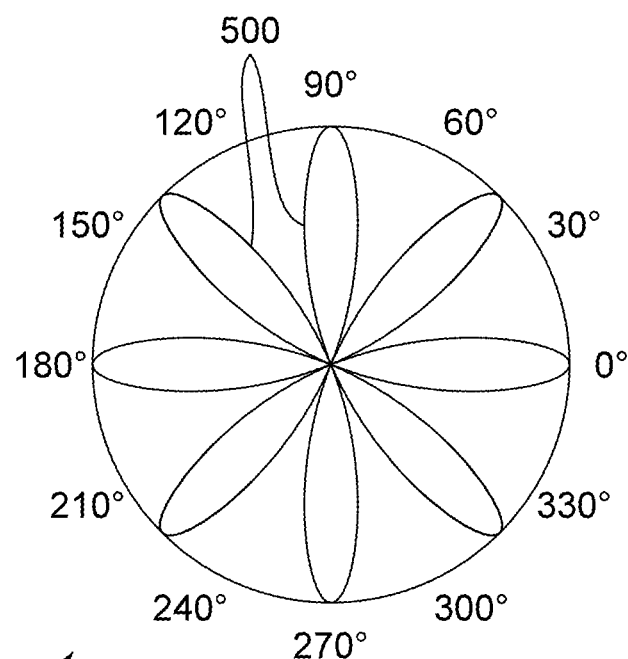
FIG. 5 is a graph of an octupole radiation and/or reception pattern.

FIG. 3 illustrates a theoretical radiation/receiving pattern of wave fields for, specifically, an ideal monopole 200, an ideal dipole 204, and an ideal quadrupole 208. Dipole 204 may produce a theoretical radiation/receiving pattern shows a shape of the number '8' which includes two lobes 300. Quadrupole 206 radiation/receiving pattern shows a shape of 'quatrefoil' which includes four lobes 302. FIG. 4 illustrates a theoretical radiation/receiving pattern of wave fields for an idea hexapole 208 with six lobes 400. FIG. 5 illustrates a theoretical radiation/receiving pattern of wave fields for octupole 212 with eight lobes 500. It should be noted that the term "higher-pole" mode is defined as a mode that includes more lobes than the previously identified mode. For example, quadrupole 308 is a "higher-order" than dipole 204 as quadrupole 308 include more lobes than dipole 204.

FIG. 6 illustrates borehole sonic logging tool 134 during drilling operations taking one or more measurements. As illustrated, borehole sonic logging tool 134 may be disposed in a borehole 102 that traverses through formation 106. In examples, borehole 102 may be filled with fluid 600. During measurement operations borehole sonic logging tool 134 may operate and function to record refracted compressional waves, refracted shear waves, and guided waves propagating along the borehole wall. Analysis of these waves yields the formation compressional and shear velocities. Borehole sonic logging tool 134 may utilize one or more transmitters 136 to broadcast acoustic waves into borehole 102. Additionally, one or more receivers 137, which may be disposed in one or more multi-sets of arrays, measures the waves inside borehole 102. In examples, transmitters 136 and receivers 137 may be placed azimuthally inside borehole sonic logging tool 134 and at a radial distance from an axis of borehole sonic logging tool 134 at/or near exterior surface 602 of borehole sonic logging tool 134. These measurements may be transmitted to information handling system 138 where the measurements may be transformed into data. The data may be processed to obtain formation slowness logs and graphs.

In examples, a transmitter 136 that is a monopole 200 (e.g., referring to FIG. 2A) is a single centered point source. However, a practical monopole 200 in logging while drilling (LWD) usually includes four small transmitters, positive phase point receivers 202 (e.g., referring to FIG. 2F), orthogonally arranged around the tool circumference, fired together with the same drive pulse. This arrangement is illustrated in FIG. 6. The positions of these individual transmitters 136 coincide with the positions of alternate transmitters 136 for an octupole 212 (e.g., referring to FIG. 2E). For an octupole 212 the interleaving sources are fired with a reversed polarity, thus including both positive phase point receivers 202 and negative phase point receiver 206 as illustrated in FIG. 2E.

Referring to FIGS. 2B and 2D, dipole 204 and hexapole 210 constructed by several decentered point sources, positive phase point receivers 202 and negative phase point receiver 206. FIG. 2D illustrates hexapole 210, which may be seen to comprise three dipoles 204, each rotated by a 60 deg azimuthal increment. This suggests dipole 204 has the potential to transmit hexapole modes. Similar considerations apply to receivers.

Mathematically, a multipole source may be realized by decomposing the general decentered point source equation into azimuthal components using the Bessel addition theorem. Thus, coupling hexapole 210 and dipole 204 is possible as a multipole source is realized by decomposing general eccentric point source (unipole) equation into azimuthal components using a Bessel addition theorem, which is seen below:

$$\Phi_d = \frac{1}{\pi}\int_{-\infty}^{+\infty}\sum_{n=0}^{+\infty}\varepsilon_n\cos(n(\theta-\theta_0))\begin{Bmatrix}I_n(fr_0)K_n(fr), r > r_0 \\ I_n(fr)K_n(fr_0), r > r_0\end{Bmatrix}e^{ik(z-z_0)}dk \quad (1)$$

In the above expression, $I_n$ (n=0, 1, . . . ) is the modified Bessel function of the first kind and order n; $\varepsilon_n$=1 for n=0, and $\varepsilon_n$=2 for n>0; $r_0$ is the radial offset of the point sources. The $j_{th}$ point of the multipole source has a sign of $(-1)^{j+1}$, a scaling factor of $$\frac{1}{2n},$$

and is located at an angle of $$\theta_0 = \pi\frac{j-1}{n} + \phi, (j = 1, \ldots, n).$$

Equation 1 illustrates an eccentric point source, or a unipole, generate all kinds of wave field orders, including the hexapole (n=3) and the octupole (n=4).

By summing the contribution of all these point sources, the resulting potential, in terms of the integrand for the k-integration, is written as:

$$\Phi_d(k, \omega) = e^{ikz}\sum_{j=1}^{+\infty}\varepsilon_{(2j-1)n}I_{(2j-1)n}(fr_0)K_{(2j-1)n}(fr)\cos((2j-1)n(\theta-\phi)) \quad (2)$$

Specifically, for $r>r_0$, and n=1 (an LWD dipole), ignoring the common factor, the field generated by a dipole source with two-point sources may include a multi-pole field, for example, $$\Phi_{LWDdipole}(k, \omega) = \quad (3)$$

$$e^{ikz}\sum_{j=1}^{+\infty}\varepsilon_{(2j-1)n}I_{(2j-1)}(fr_0)K_{(2j-1)}(fr)\cos((2j-1)n(\theta-\phi))$$

Ignoring the common term, provides the following equation:

$$\tilde{\Phi}_{LWDdipole}=I_1(fr_0)K_1(fr)+I_3(fr_0)K_3(fr)+I_5(fr_0)K_5(fr)+ \ldots \quad (4)$$

where $I_1(fr_0)K_1(fr)$ represents the dipole field, $I_3(fr_0)K_3(fr)$ denotes the hexapole field. When the radial offset $r_0$ is small compared to signal radial wavelength, as in the case of a wireline dipole transmitter, the coefficient $I_1(fr_0)$ is much larger than the coefficient of $I_3(fr_0)$, the hexapole wave field with the coefficient of $I_3(fr_0)$ may be ignored due to its low amplitude. However, for acoustic LWD, the radial offset $r_0$ is large compared to signal radial wavelength, and the hexapole modes are measured and part of a final recorded waveform by an LWD monopole firing.

For monopole 200 with four elements, which may be referred to as point sources, disposed on BHA 130 (e.g., referring to FIGS. 1, 2F, and 6), taking a summation of four decentered point sources with the same drive-pulse, the generated wave field is expressed as:

$$\Phi_{LWDmono} = e^{ikz}\sum_{k=0}^{+\infty}\sum_{j=1}^{4}\varepsilon_i I_i(fr_0)K_i(fr)\cos\left(i\left(\theta-\frac{j-1}{2}\pi-\phi\right)\right) \quad (5)$$

Ignoring the common term, the equation becomes:

$$\tilde{\Phi}_{LWDdipole}=4I_0(fr_0)K_0(fr)+8I_4(fr_0)K_4(fr)+8I_8(fr_0)K_8(fr)+ \ldots \quad (6)$$

where $I_0(fr_0)K_0(fr)$ and $I_4(fr_0)K_4(fr)$ denote the monopole and octupole fields, respectively. When the radial offset $r_0$ is small, $I_0(fr_0)$ is much larger than the coefficient of $I_4(fr_0)$, and the octupole component may be ignored. However, for an LWD monopole, the octupole mode significantly contributes to the total wave field due to its larger radial offset $r_0$.

In addition, it should be noted that for the higher-pole waves, the Bessel function $K_n(fr)$ decreases rapidly with the increasing r, while $I_n(fr_0)$ increases rapidly with increasing of the source radial position $r_0$. Thus, higher-pole modes may be detected as the tool diameter approaches that of the borehole sidewall.

Traditional efforts for determining a formation shear-wave slowness in LWD are based on dipole flexural waves or quadrupole screw waves. However, dipole flexural waves are not asymptotic to shear waves at low frequencies and may be influenced by coupled Stoneley wave due to eccentric or unbalanced receivers. While quadrupole screw waves are good in soft formation, it may provide biased results in fast and medium formation, as their dispersion curves become very steep at low frequencies, when the borehole wall is close to the outermost surface of BHA 130 (e.g., referring to FIG. 1). Therefore, in both fast and slow formations, generating low-frequency data is difficult for transmitters 136 (e.g., referring to FIG. 1) disposed on BHA 130 during LWD operations. Thus, low-frequency components of the dispersion curve are hard to measure. For fast formation, common methods involve monopole refracted shear waves for shear slowness picking. However, for medium slowness formations, these waves may not be well excited.

Additionally, flexural/screw dispersion is strongly affected by BHA 130 (e.g., referring to FIG. 1). Such effects need to be removed for accurate estimation of formation shear slowness. However, the effects from BHA 130 on the flexural/screw dispersion may be complicated, in which give rise to another uncertainty in the final shear picking.

Figure 7A:
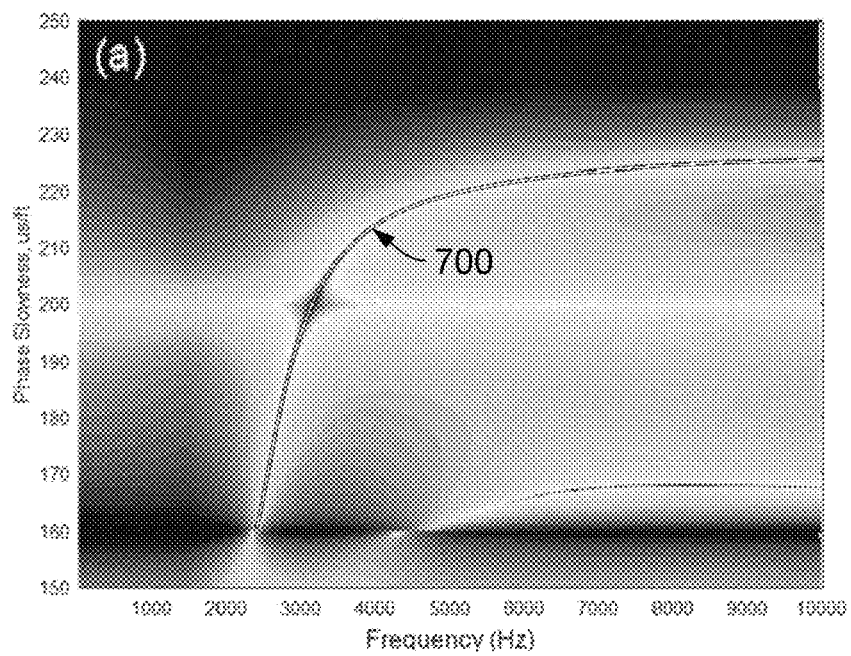
FIGS. 7A and 7B are graphs modeling a screw wave.
Figure 7B:
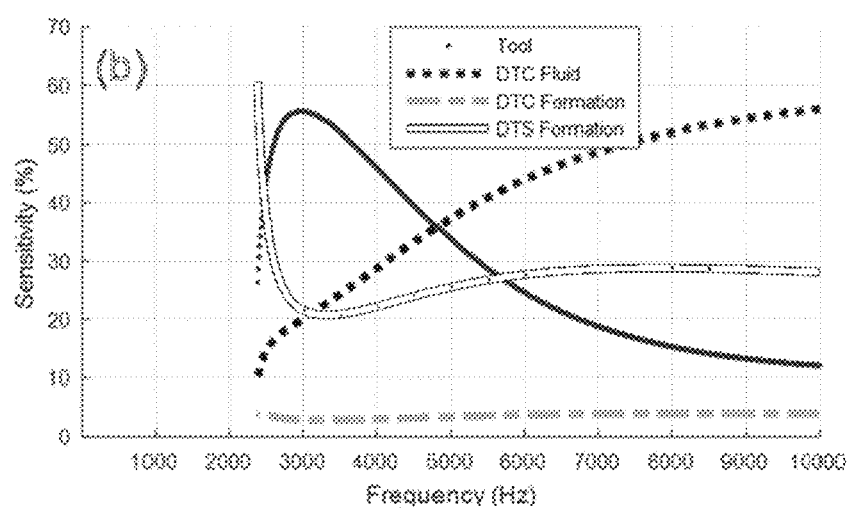

For example, FIG. 7A is a graph modeling theoretical data of screw wave 700 dispersion generated by a quadrupole. FIG. 7B shows the sensitivity of the theoretical screw dispersion to different modeling parameters. As illustrates, the screw wave 700 dispersion is steep and has large sensitivity values to tool parameters below 4 kHz. It suggests screw wave 700 dispersion below 4 kHz is strongly affected by borehole sonic logging tool 134 (e.g., referring to FIG. 6) parameters. Additionally, screw wave 700 is also sensitive to the diameter of borehole 102 (e.g., referring to FIG. 6). Thus, the resulting shear slowness (DTS) estimation may contain errors, particularly when the low-frequency portion of the data exhibits a low signal-to-noise ratio.

The hexapole mode and octupole mode may be used to estimate the formation shear wave slowness within the difficulties described above. For example, FIGS. 8A, 8B, 9A, and 9B are graph modeling theoretical data of hexapole dispersion and octupole dispersion, respectively. It suggests these higher-pole modes are only weakly sensitive to the tool, and they are sensitive to the formation shear slowness and show weaker dispersion than the screw waves. For example, referring to FIGS. 10A and 10 B, the excitation frequency of higher-pole modes is higher than that of the flexural waves and screw waves 700 (e.g., referring to FIG. 7). FIG. 10A illustrates modal dispersion for monopole, dipole, quadrupole, hexapole, and octupole. FIG. 10B illustrates the excitation amplitude of different modes. As illustrated in FIG. 10B, with increasing pole numbers, the excitation frequency increases. This simplifies transmitter design and helps decouple these modes from Stoneley contamination. Additionally, the hexapole waves and the octupole modes are less sensitive to the LWD tool properties and borehole caliper. Therefore, when observed, these modes may be more suitable than the fundamental modes for formation slowness estimation.

Figure 8A:
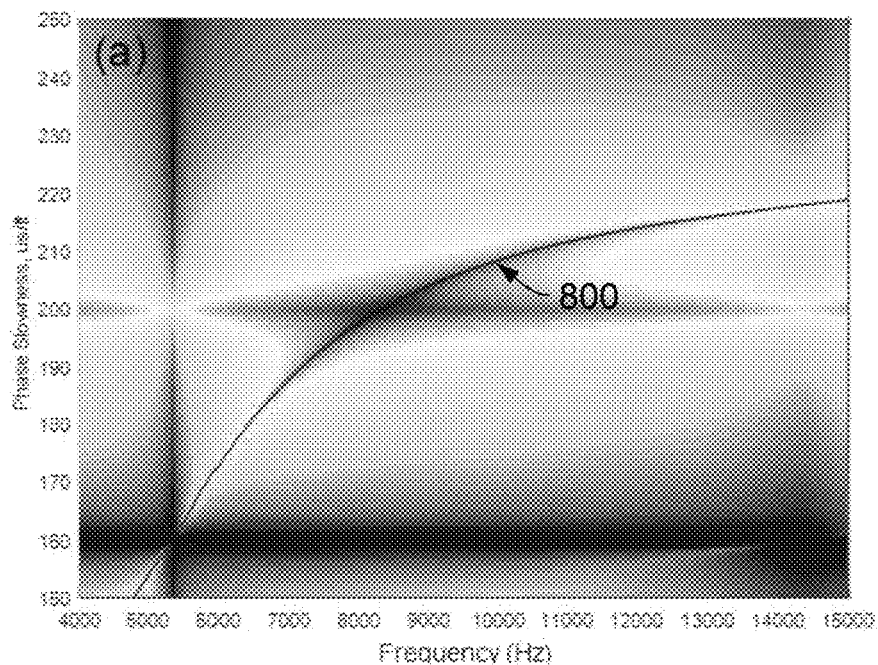
FIGS. 8A and 8B are graphs modeling a hexapole mode.
Figure 8B:
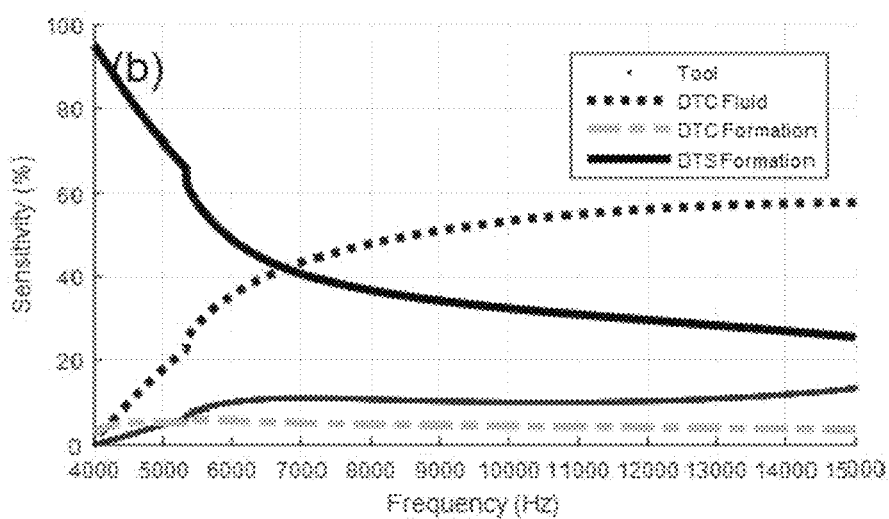

FIG. 8A illustrates the dispersions and sensitivity of hexapole 800. FIG. 8B illustrates the sensitivity values of the theoretical hexapole dispersion to different modeling parameters. As illustrated, a higher-pole mode may only be slightly sensitivity to borehole sonic logging tool 134 (e.g., referring to FIG. 6). However, hexapole 800 may be sensitive to formation shear slowness and show weaker dispersion than screw waves 700 (e.g., referring to FIG. 7A). The excitation frequency of higher-pole modes is higher than that of flexural waves and screw waves 700, referring to FIGS. 10A and 10B. For example, designed high-pole transmitters may be used to excite these higher-pole modes, but they are also excited by conventional LWD monopole and dipole transducers, as described by Equations (4) and (6). This simplifies transmitter design and helps decouple these modes from Stoneley contamination. Additionally, hexapole 800 may be less sensitive to properties of borehole sonic logging tool 134 (e.g., referring to FIG. 6) and borehole calipers. Thus, hexapole 800 may be suitable for formation slowness estimation.

Figure 9A:
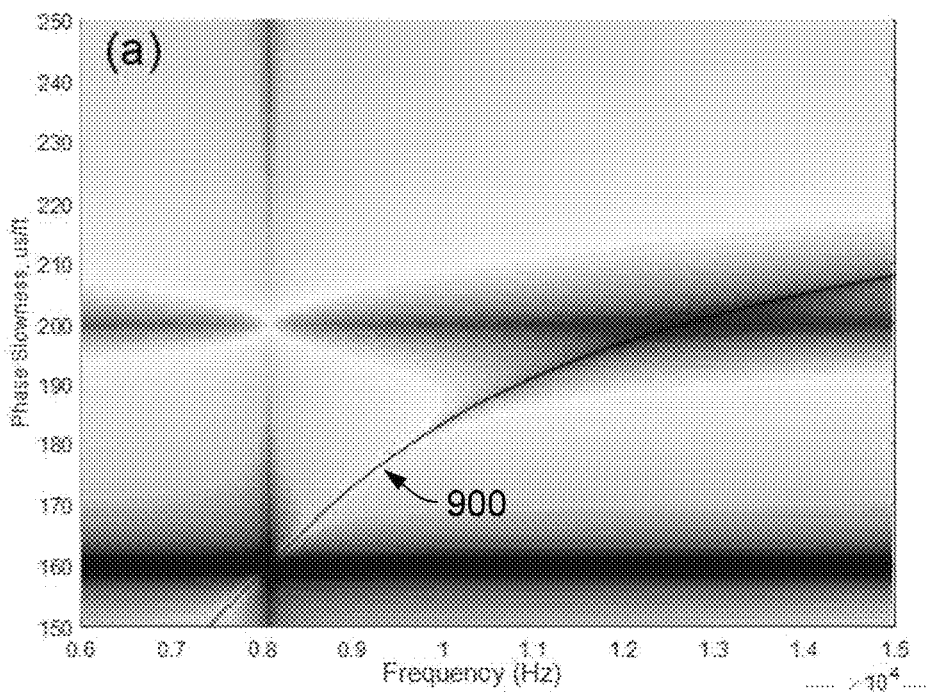
FIGS. 9A and 9B are graphs modeling an octupole mode.
Figure 9B:
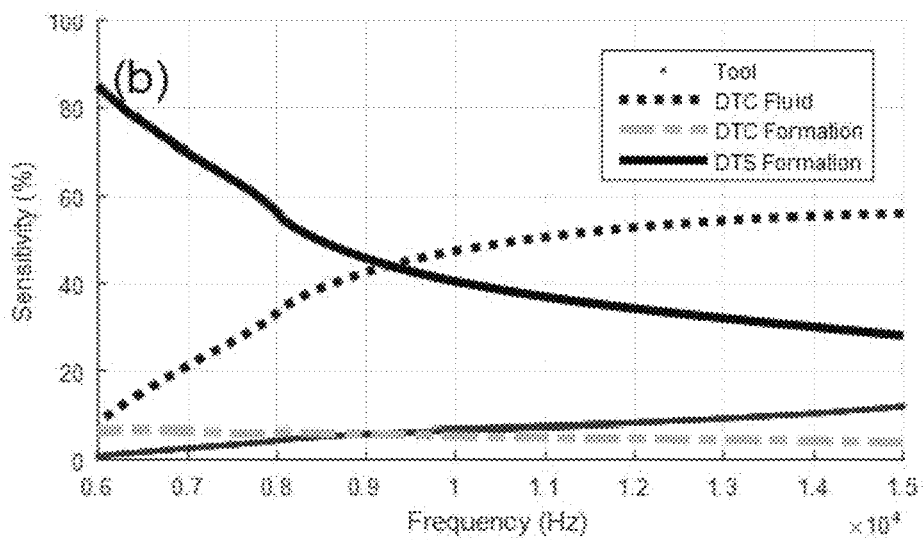
Figure 10A:
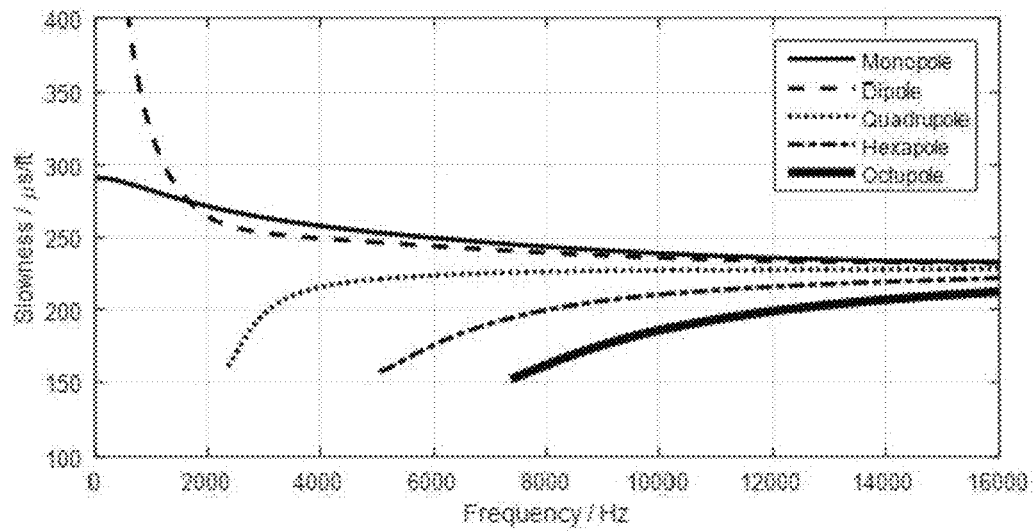
FIGS. 10A and 10B are graphs illustrating one or more borehole acoustic mode waves.
Figure 10B:
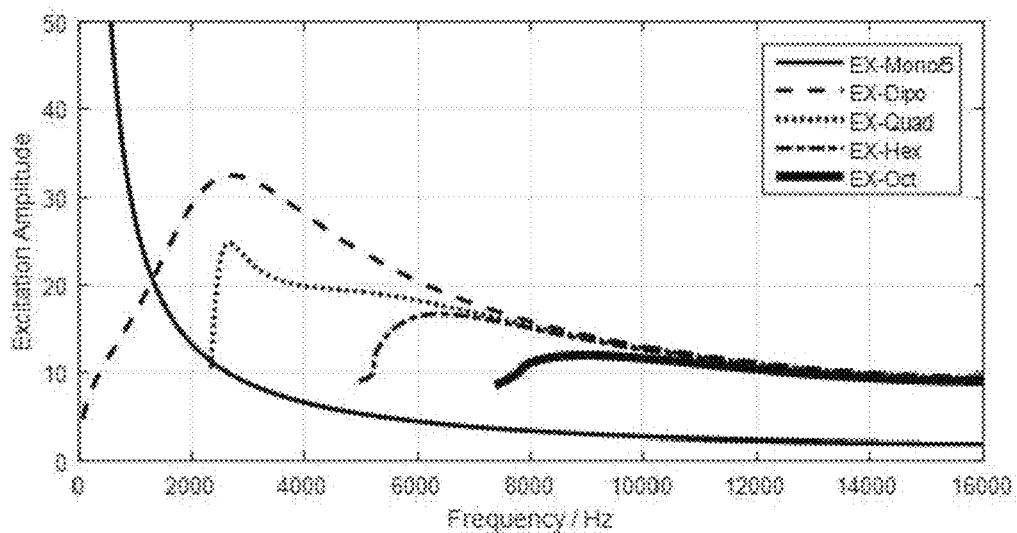

FIG. 9A illustrates the dispersions and sensitivity of octupole 900. FIG. 9B shows the sensitivity values of the theoretical octupole dispersion to different modeling parameters. As illustrated, a higher-pole mode may be sensitivite to borehole sonic logging tool 134 (e.g., referring to FIG. 6). However, octupole 900 may be sensitive to formation shear slowness and show weaker dispersion than screw waves 700 (e.g., referring to FIG. 7A). The excitation frequency of higher-pole modes is higher than that of flexural waves and screw waves 700. This simplifies transmitter design and helps decouple these modes from Stoneley contamination. Additionally, octupole 900 may be less sensitive to properties of borehole sonic logging tool 134 and borehole calipers. Thus, octupole 900 may be suitable for formation slowness estimation.

FIG. 11A is a graphic of a comparison between modeling theoretical data and extracted dispersions of measured waveforms by an LWD monopole firing. As illustrated, circles 1100 are extracted slowness. Additionally, borehole wave dispersions are illustrated by monopole stoneley 1102, octupole mode 1104, dipole flexural mode 1106, quadruople screw mode 1108, and hexapole 1110. Circles 1100 are consistent with monopole stoneley 1102 and octupole 1104, suggesting these two modes exist in the measured data and the LWD monopole source does have the capability of transmitting octupole wave field.

FIG. 11B is a graph modeling theoretical data of extracted dispersions of measured waveforms after a dipole firing. As illustrated, circles 1100 are extracted slowness. Additionally, borehole wave dispersions are illustrated by monopole stoneley 1102, octupole mode 1104, dipole flexural mode 1106, quadruople screw mode 1108, and hexapole 1110. Circles 1100 in FIG. 11B are consistent with dipole flexural wave 1106 and hexapole mode 1110, suggesting the two modes exist in the measured data and the LWD dipole transmitter does have the capability of transmitting hexapole wave field. In both FIGS. 11A and 11B, the darker the color the more reliable the data. Additionally, both hexapole mode 1110 and octupole mode 1104 have weak dispersion effect and is close to true shear, thus are able to provide an accurate shear slowness. Thus, the dispersion effect identifies that modal slowness is different at one or more frequencies. For example, a measurement of mode waves with a specific frequency, measured slowness is different from formation shear wave measurements, which is defined as a dispersion effect.

Figures 12A, 12B:
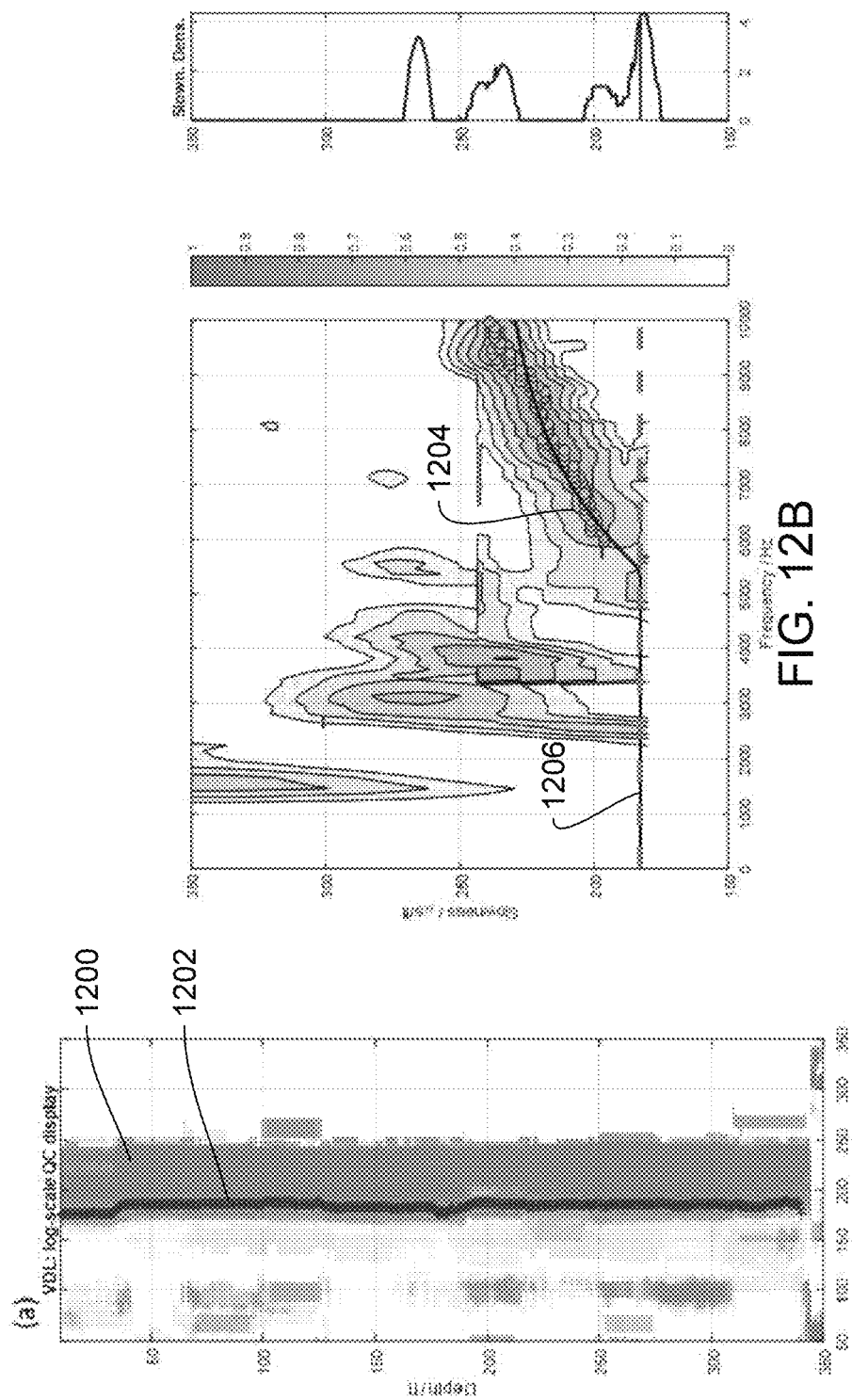
FIG. 12A is slowness density QC of an LWD dipole data overlaid by the extracted shear slowness value from hexapole waves.
FIG. 12B is a single acquisition display of processing data from FIG. 12A.

FIGS. 12A and 12B are graphs that illustrate shear slowness estimating from hexapole mode of borehole sonic logging tool 134 (e.g., referring to FIG. 1) using theoretical data. Specifically, FIG. 12A is slowness density QC 1200 overlaid by the extracted shear slowness value 1202 and FIG. 12B is a single acquisition display of the processing, where circles 1204 represent the hexapole dispersion measurement and solid line 1206 represent the estimated hexapole dispersion. Data inbetween 6 kHz and 10 kHz is identified as the hexapole modes, and the processing is performed by minimizing the dispersion measurement and theoretical dispersion in the said frequency range. As illustrated, the modeling data of the hexapole disposer, identified by solid line 1206, is consistent with hexapole dispersion measurement, identified by circles 1204, which identifies processing is reliable.

Figures 13A, 13B:
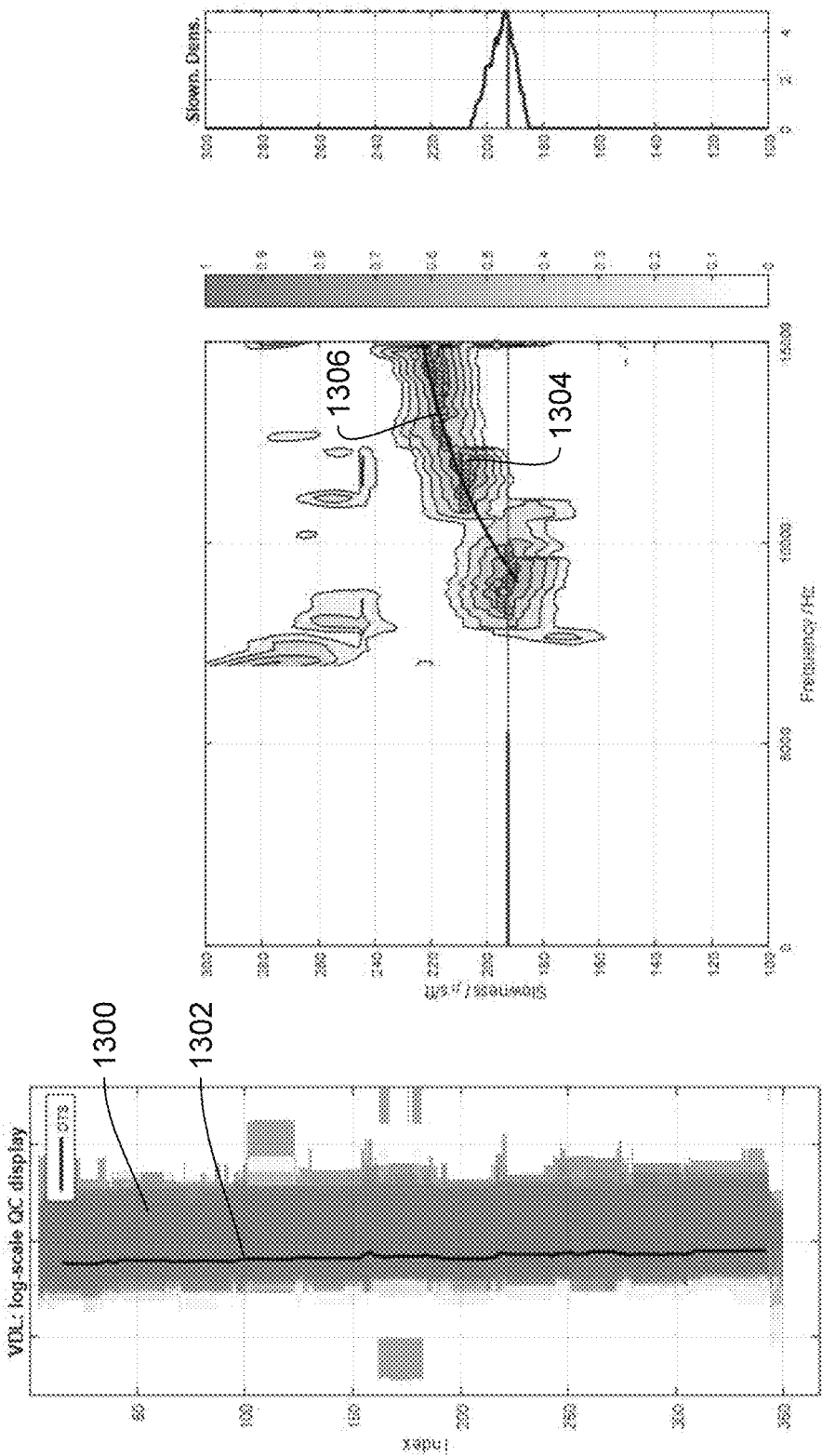
FIG. 13A is slowness density QC of an LWD monopole data overlaid by the extracted shear slowness value from octupole waves.
FIG. 13B is a single acquisition display of processing data from FIG. 12A.

FIGS. 13A and 13B are graphs that illustrate shear slowness estimating from an octupole mode of borehole sonic logging tool 134 (e.g., referring to FIG. 1) using theoretical data. Specifically, FIG. 13A is slowness density QC 1300 overlaid by the extracted shear slowness value 1302 and FIG. 13B is a single acquisition display of the processing, where circles 1304 represent the octupole dispersion measurement and the solid line 1306 represent the estimated octupole dispersion. Data inbetween 6 kHz and 10 kHz is identified as the octupole modes, and the processing is performed by minimizing the dispersion measurement and theoretical dispersion in the said frequency range. Furthermore, FIG. 13B illustrates a "fit" between measurements and modeling, which indicates the processing is reliable. In examples, "fit" is defined as the ability of data points to lie on a theoretical curve. Specifically, the curve has to pass through the values encompassed by the point value and the associated measurement error estimates. In examples, the "fit" is measured by the root mean square of the differences between the measured value and the predicted values.

Figure 14:
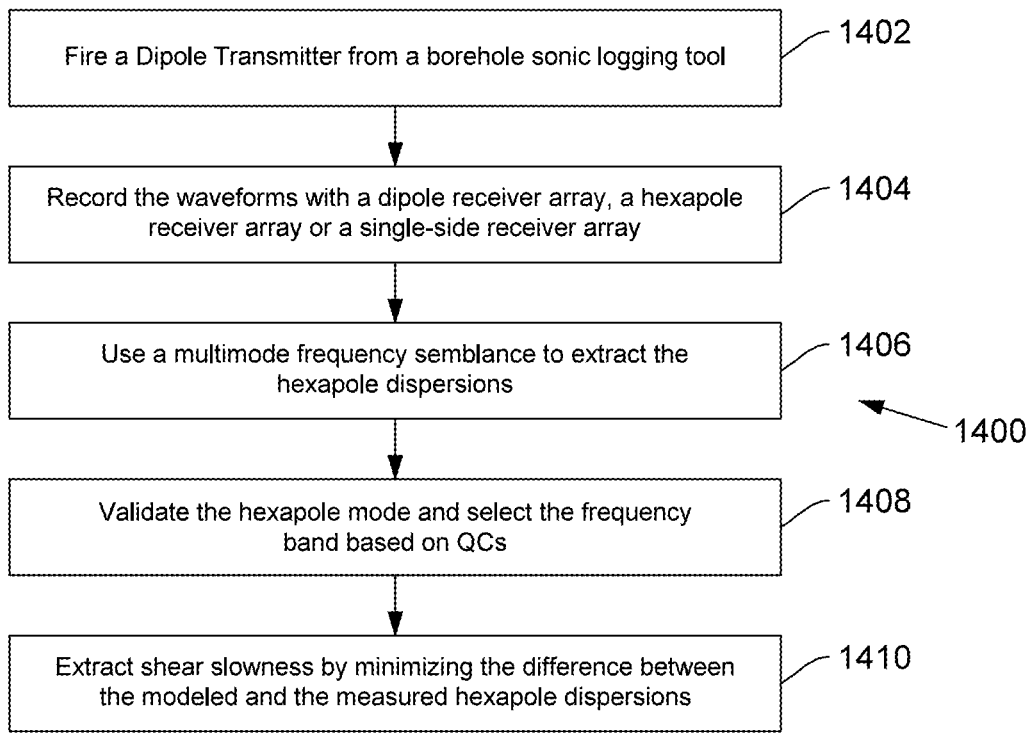
FIG. 14 is a workflow for estimating shear slowness from hexapole waves generated by an LWD dipole source.

FIG. 14 illustrates workflow 1400 of estimating shear slowness from the hexapole waves generated by an LWD dipole source. Workflow 1400 may begin with block 1402. In block 1402, a dipole transmitter is fired to generate both a dipole wavefield and a hexapole wavefield. In block 1404, the borehole wave fields are recorded with a dipole receiver array, a unipole receiver array or a hexapole receiver array. In examples, a unipole receiver array includes one or more single side elements, as illustrated in FIG. 2G and FIG. 6. If the unipole receiver array is used, a unipole receiver that is close to the borehole sidewall may provide more hexapole waves.

From block 1404, in block 1406 a multimode frequency semblance method to extract the hexapole dispersions. For example, starting with the waveforms (pressure variation with time) measured at each receiver 137 (e.g., referring to FIG. 6) from a single source firing, different modes crossing one or more receiver 137 in an array is identified. A mode is a pattern of vibration propagating along borehole 102 (e.g., referring to FIG. 6) with a specific particle motion and traveling at a well-defined velocity (or equivalently slowness=1/velocity) which may vary with frequency (defined as dispersive). In principle, the complete wave field may be decomposed into a set of modes, which is beneficial in that theoretical models link the characteristics of these modes (slowness, excitation and attenuation as a function of frequency) to the propagation of acoustic waves in formation 106 (i.e. formation 106 without borehole 102).

Received waveforms are decomposed into modes using a semblance algorithm, which come in a number of time domain and frequency domain varieties. Each mode is utilized to measure the similarity of the waveform from one receiver 137 to another receiver 137 along borehole sonic logging tool 134, after shifting the waveform in time (or equivalently in phase, for frequency domain algorithms) appropriate to the relevant slowness and receiver spacing. For a particular slowness-frequency pair a high value of semblance is returned if a mode is present in the data at that slowness and frequency. Multiple modes (with different slownesses and polarizations) may be present at the same time. Some algorithms may be better suited to detecting multiple modes (at different slownesses) at each frequency, than algorithms which may return only one mode. Algorithms that return the highest semblance in a set at each frequency are identified as a "multimode" algorithm. As the waveform include both dipole and hexapole wavefield, so a multimode frequency semblance processing is required.

In block 1408, the hexapole mode is validated and frequency bands based on quality controls "QCs" are selected. Validation is performed by ensuring a measured dispersion curve (higher semblance measurement) "fits" a theoretical curve (for a candidate formation slowness). This is performed by comparing the measurement and the modeling, and a selected frequency band. In block 1410, shear slowness is extracted by minimizing the difference between the modeled and the measured hexapole dispersions. This may be performed by a dispersion match processing on multifrequencies by minimizing the difference between the modeled and the measured hexapole dispersions. The output from block 1410 is shear slowness.

Figure 15:
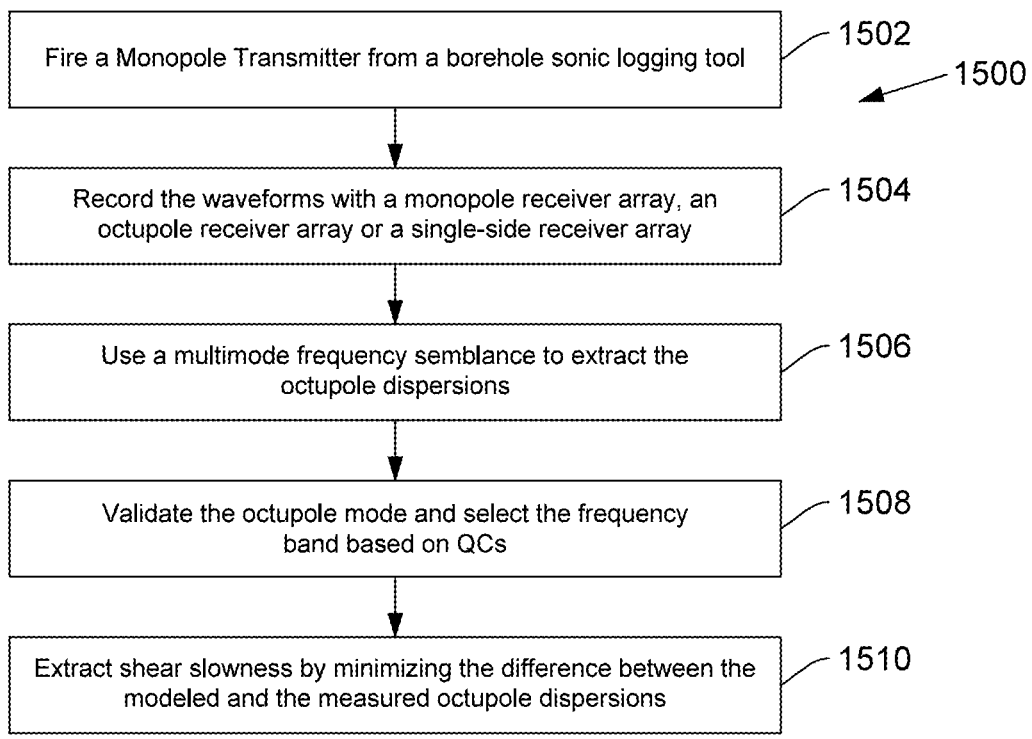
FIG. 15 is a workflow for estimating shear slowness from octupole waves generated by an LWD monopole source.

FIG. 15 illustrates workflow 1500 of estimating shear slowness from the octupole waves generated by a monopole source. Workflow 1500 may begin with block 1502. In block 1502, a monopole transmitter is fired to generate both a monopole wavefield and an octupole wavefield. In block 1504, the reflected waveforms are recorded with a dipole receiver array, an octupole receiver array or a unipole receiver array. In examples, if the unipole receiver array is used, an azimuthal receiver that is far away from the borehole sidewall may provide reliable data. From block 1504, in block 1506 a multimode frequency semblance method to extract the octupole dispersions. For example, starting with the waveforms (pressure variation with time) measured at each receiver 137 (e.g., referring to FIG. 6) from a single source firing, different modes crossing one or more receiver 137 in an array is identified. A mode is a pattern of vibration propagating along borehole 102 (e.g., referring to FIG. 6) with a specific particle motion and traveling at a well-defined velocity (or equivalently slowness=1/velocity) which may vary with frequency (defined as dispersive). In principle, the complete wave field may be decomposed into a set of modes, which is beneficial in that theoretical models link the characteristics of these modes (slowness, excitation and attenuation as a function of frequency) to the propagation of acoustic waves in formation 106 (i.e. formation 106 without borehole 102).

In block 1508, the octupole mode is validated and frequency bands based on quality controls "QCs" are selected. Validation is performed by comparing the existence frequency and slowness and the shape between the modeling theoretical curves and the measured octupole mode. If the measured data appears in the frequency band of the modeling octupole dispersion and the shape of measured data agrees with that of the modeling dispersions, then the measured data is validated as octupole waves. In examples, a frequency band is chosen where the measured dispersions are validated and the semblance values are larger than a fixed threshold, for example, 0.5. These QCs refers to the semblance values of the modes. In block 1510, shear slowness is extracted by minimizing the difference between the modeled and the measured octupole dispersions. This may be performed by a dispersion match processing on multifrequencies by minimizing the difference between the modeled and the measured octupole dispersions. The output from block 1510 is shear slowness.

The claimed method of estimating formation shear-wave slowness from hexapole, octupole or higher-pole modes recorded by LWD tools is superior to conventional methods using dipole or quadrupole modes. This is because the hexapole and octupole modes dispersion curves approach the shear-wave slowness more gradually, and reach the shear-wave value at higher frequencies. This, combined with the fact that they are more easily excited at higher frequencies than the dipole and quadrupole modes make them easier to generate, record and interpret. Critically, these measurements can be made by conventional LWD transmitters, which are designed to emit monopole or dipole modes, also generate octupole and hexapole modes, respectively, and do so at measurable amplitudes.

Statement 1. A system for calculating a formation shear-wave slowness may comprise a borehole sonic logging tool. The borehole sonic logging tool may comprise a transmitter comprising one or more elements disposed at one or more radial distances from an axis of the borehole sonic logging tool, wherein the transmitter is configured to transmit a first mode into a borehole. The borehole sonic logging tool may further comprise one or more receivers disposed at a second radial distance from the axis of the borehole sonic logging tool, wherein the one or more receivers are configured to detect a second mode that one or more lobes than is a higher order than the first mode. The system may further comprise an information handling system configured to calculate the formation shear-wave slowness from the second mode.

Statement 2. The system of statement 1, wherein the first mode is a monopole mode and the second mode is an octupole mode.

Statement 3. The system of statements 1 or 2, wherein the first mode is a dipole mode and the second mode is a hexapole mode.

Statement 4. The system of statements 1-3, wherein the first mode is a unipole and the second mode comprises a hexapole mode or an octupole mode.

Statement 5. The system of statements 1-4, wherein the information handling system is further configured to apply a multimode frequency semblance to the second mode to form a dispersion log.

Statement 6. The system of statement 5, wherein the information handling system is further configured to extract a hexapole dispersion from the dispersion log.

Statement 7. The system of statement 6, wherein the information handling system is further configured to validate a hexapole mode and select a frequency band based on one or more quality controls.

Statement 8. The system of statement 7, wherein the calculate the formation shear-wave slowness is performed by minimizing a difference between a modeled hexapole dispersion and the hexapole dispersion.

Statement 9. The system of statement 5, wherein the information handling system is further configured to extract an octupole dispersion from the dispersion log.

Statement 10. The system of statement 9, wherein the information handling system is further configured to validate an octupole mode and select a frequency band based on one or more quality controls and wherein the calculate the formation shear-wave slowness if performed by minimizing a difference between a modeled octupole dispersion and a measured octupole dispersion.

Statement 11. A method for determining a formation shear-wave slowness may comprise disposing a borehole sonic logging tool into a borehole. The borehole sonic logging tool may comprise a transmitter comprising one or more elements that are disposed at one or more radial distances from an axis of the borehole sonic logging tool, wherein the transmitter is configured to transmit a first mode into a borehole. The borehole sonic logging tool may further comprise one or more receivers disposed at a second radial distance from the axis of the borehole sonic tool, wherein the one or more receivers are configured to detect in a second mode that is a higher order form the first mode. The method may further comprise broadcasting the first mode into the borehole, recording the second mode from the borehole with the one or more receivers, and calculating the formation shear-wave slowness from the second mode.

Statement 12. The method of statement 11, wherein the first mode is a monopole mode and the second mode is an octupole mode.

Statement 13. The method of statements 11 or 12, wherein the first mode is a dipole mode and the second mode is a hexapole mode.

Statement 14. The method of statements 11-13, wherein the first mode is a unipole and the second mode comprises a hexapole mode or an octupole mode.

Statement 15. The method of statements 11-14, further comprising applying a multimode frequency semblance to the hexapole mode or the octupole mode to form a dispersion log.

Statement 16. The method of statement 15, further comprising extracting a hexapole dispersion from the dispersion log and validating a hexapole mode based on one or more quality controls.

Statement 17. The method of statement 16, wherein the formation shear-wave slowness if performed by minimizing a difference between a modeled hexapole dispersion and the hexapole dispersion.

Statement 18. The method of statement 17, further comprising extracting an octupole dispersion from the dispersion log.

Statement 19. The method of statement 18, further comprising validating an octupole mode and select a frequency band based at least in part on one or more quality controls.

Statement 20. The method of statement 19, wherein the calculating the formation shear-wave slowness is performed by minimizing a difference between a modeled octupole dispersion and a measured octupole dispersion.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A system for calculating a formation shear-wave slowness comprising:
 a borehole sonic logging tool comprising:
  a transmitter comprising one or more elements disposed on the borehole sonic logging tool, wherein the transmitter is configured to transmit a first mode into a borehole; and
  one or more receivers disposed on the borehole sonic logging tool, wherein the one or more receivers are configured to detect a second mode that one or more lobes than is a higher order than the first mode; and
 an information handling system configured to apply a multimode frequency semblance to the second mode to form a dispersion log and calculate the formation shear-wave slowness from the second mode based at least in part on the dispersion log.

2. The system of claim 1, wherein the first mode is a monopole mode and the second mode is an octupole mode.

3. The system of claim 1, wherein the first mode is a dipole mode and the second mode is a hexapole mode.

4. The system of claim 1, wherein the first mode is a unipole and the second mode comprises a hexapole mode or an octupole mode.

5. The system of claim 1, wherein the information handling system is further configured to extract a hexapole dispersion from the dispersion log.

6. The system of claim 5, wherein the information handling system is further configured to validate a hexapole mode and select a frequency band based on one or more quality controls.

7. The system of claim 6, wherein the calculate the formation shear-wave slowness is performed by minimizing a difference between a modeled hexapole dispersion and the hexapole dispersion.

8. The system of claim 5, wherein the information handling system is further configured to extract an octupole dispersion from the dispersion log.

9. The system of claim 8, wherein the information handling system is further configured to validate an octupole mode and select a frequency band based on one or more quality controls and wherein the calculate the formation shear-wave slowness if performed by minimizing a difference between a modeled octupole dispersion and a measured octupole dispersion.

10. A method for determining a formation shear-wave slowness comprising:
 disposing a borehole sonic logging tool into a borehole, wherein the borehole sonic logging tool comprises:
  a transmitter comprising one or more elements that are disposed on the borehole sonic logging tool, wherein the transmitter is configured to transmit a first mode into a borehole; and
  one or more receivers disposed on the borehole sonic tool, wherein the one or more receivers are configured to detect in a second mode that is a higher order form the first mode;
 broadcasting the first mode into the borehole;
 recording the second mode from the borehole with the one or more receivers;
 applying a multimode frequency semblance to the second mode to form a dispersion log;
 calculating the formation shear-wave slowness from the second mode based at least in part on the dispersion log.

11. The method of claim 10, wherein the first mode is a monopole mode and the second mode is an octupole mode.

12. The method of claim 10, wherein the first mode is a dipole mode and the second mode is a hexapole mode.

13. The method of claim 10, wherein the first mode is a unipole and the second mode comprises a hexapole mode or an octupole mode.

14. The method of claim 10, further comprising extracting a hexapole dispersion from the dispersion log and validating a hexapole mode based on one or more quality controls.

15. The method of claim 14, wherein the formation shear-wave slowness if performed by minimizing a difference between a modeled hexapole dispersion and the hexapole dispersion.

16. The method of claim 15, further comprising extracting an octupole dispersion from the dispersion log.

17. The method of claim 16, further comprising validating an octupole mode and select a frequency band based at least in part on one or more quality controls.

18. The method of claim 17, wherein the calculating the formation shear-wave slowness is performed by minimizing a difference between a modeled octupole dispersion and a measured octupole dispersion.

* * * * *